Oct. 9, 1945. L. H. SMITH 2,386,512
CLUTCH OPERATING MECHANISM
Filed April 2, 1943 2 Sheets-Sheet 1
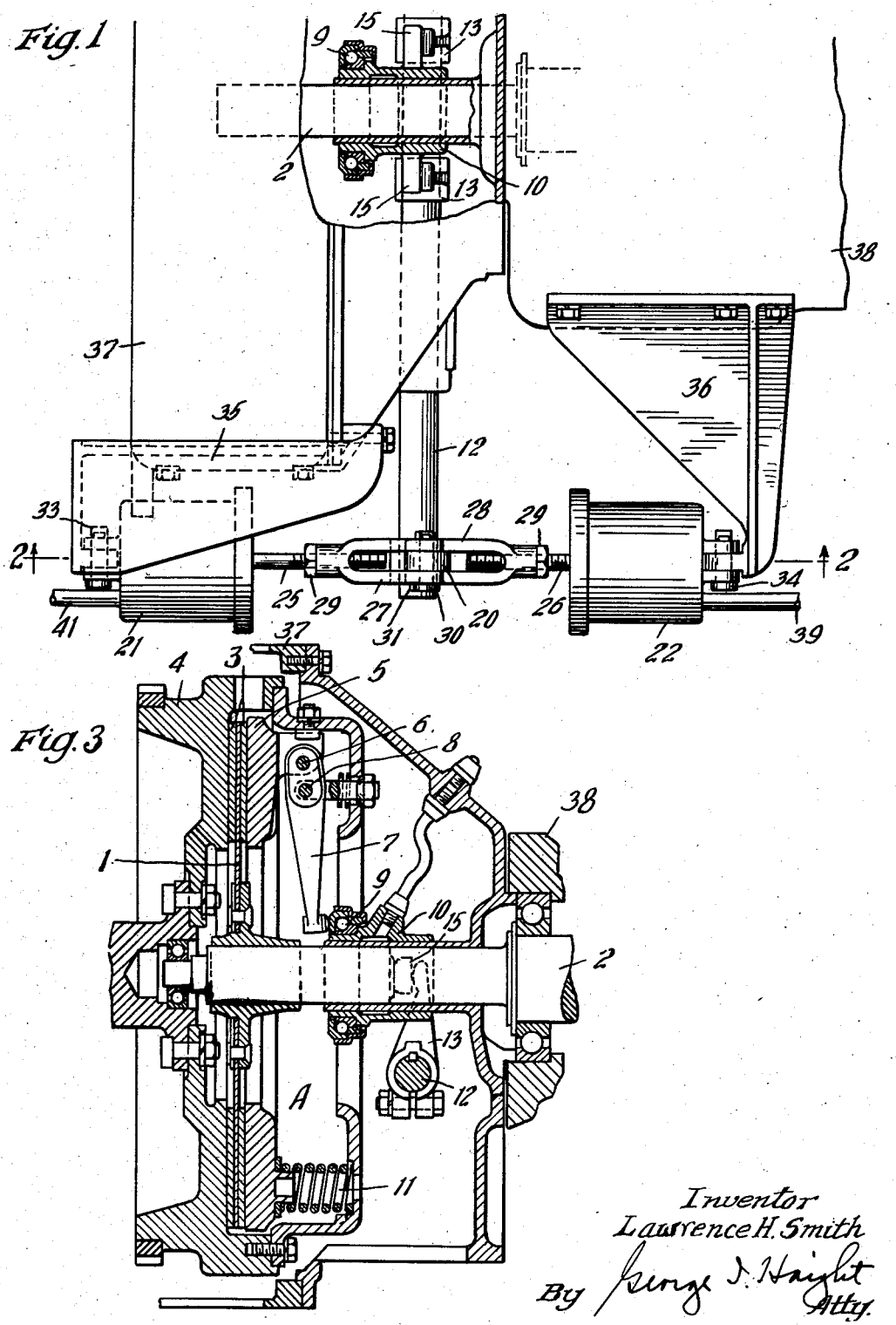

Oct. 9, 1945.  L. H. SMITH  2,386,512
CLUTCH OPERATING MECHANISM
Filed April 2, 1943  2 Sheets-Sheet 2
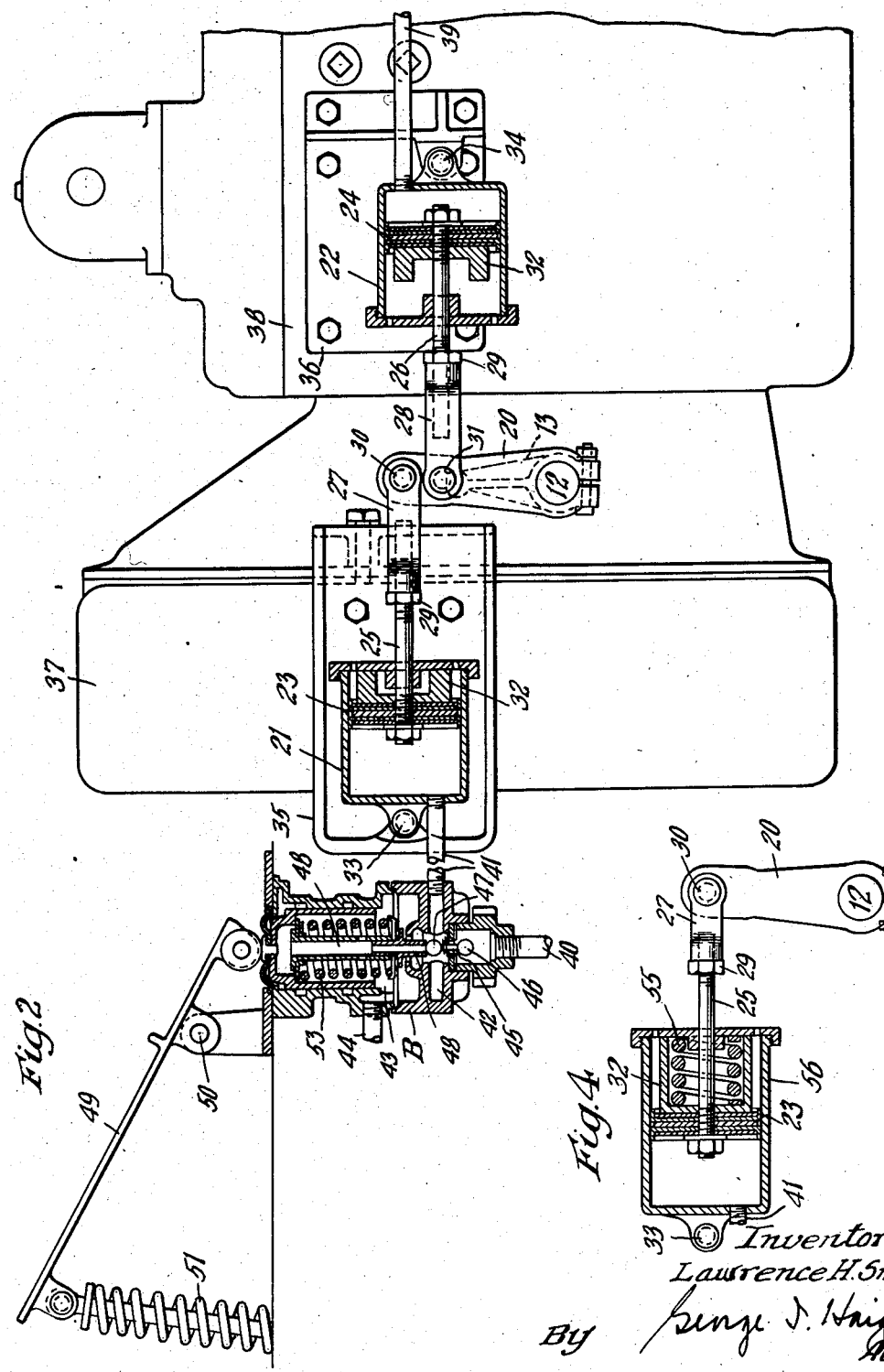
Inventor
Lawrence H. Smith
By George J. Haight
Atty.

Patented Oct. 9, 1945

2,386,512

UNITED STATES PATENT OFFICE 2,386,512

CLUTCH OPERATING MECHANISM

Lawrence H. Smith, Chicago, Ill., assignor to General American Aerocoach Company, Chicago, Ill., a corporation of Delaware Application April 2, 1943, Serial No. 481,547

3 Claims. (Cl. 192—91)

My invention relates to improvements in clutch operating mechanisms and has particular reference to an improved, pneumatically controlled mechanism for actuating the clutch of motor vehicles.

One of the principal objects of my invention is to provide a pneumatic operating mechanism for throwing the clutch mechanism into or out of operation, in which the admission of air under pressure to the mechanism controls the letting-in or throwing-in operation of the clutch, and renders this operation smooth and effectual and free from grabbing.

Another object of my invention is to provide a pneumatic, power operated mechanism for operating the clutch, which will relieve the operator of the tiresome effort resulting from the manual operation of the clutch.

Other objects of my invention will appear hereinafter.

Referring to the accompanying drawings, which illustrate one embodiment of the invention, Fig. 1 is a plan view of the throw-out shaft of a clutch mechanism and the pneumatically operated cylinder and piston mechanism connected with said throw-out shaft for operating the same;

Fig. 2 is a vertical section substantially on the line 2—2 of Fig. 1, together with a sectional view of the throttle or metering valve for controlling the flow of air under pressure to throw in the cylinder;

Fig. 3 is a sectional view of a conventional type of clutch used in motor vehicles for connecting and disconnecting the motor with respect to the transmission mechanism of the vehicle; and Fig. 4 is a sectional view of a modification of the mechanism shown in Figs. 1 and 2.

Referring first to Fig. 3, there is shown in section a clutch A of the usual or conventional type in which a clutch plate 1 is carried upon a driven shaft 2 and is positioned between driving plates 3 carried by the flywheel of the motor 4 and a clamping member 5. When these plates are clamped together, the coupling or driving connection between the motor and the driven mechanism of the vehicle is established and the clutch is said to be in, or closed. Conversely, when the driving and driven plates are relieved of clamping pressure and slightly separated, the driving plates can rotate with the motor independently of the driven plate and the clutch is said to be out or open.

In the usual type of clutch such as shown in Fig. 3, the clamping member 5 is pivotally connected at 6 to a series of levers 7 which are fulcrumed on relatively fixed mountings 8. These levers converge radially to a bearing 9 which is carried by a sleeve 10 movable longitudinally on a support surrounding the driven shaft 2, so that when the sleeve 10 is shifted to the left in Fig. 3, it swings the levers 7 about their fulcrums and carries the clamping member 5 away from the clutch plates, thus opening or throwing out the clutch. This clamping member, however, is normally clamped against the plates by means of a series of springs 11, so that the clutch is normally closed. Thus, in opening or throwing out the clutch, the power or force applied to the sleeve 10 must be sufficient to overcome pressure of the springs 11 on the clamping member.

Power is applied to the shiftable sleeve 10 through a clutch throw-out shaft 12, which carries fingers 13 adapted to bear against lugs or ears 15 on the sleeve 10. Thus when the shaft 12 is rotated in its bearings in one direction by power applied thereto, it shifts the sleeve and opens the clutch; and when the pressure or power on the shaft is relieved, the clutch springs 11, acting through the levers 7 of the clutch, rotate the shaft in the opposite direction and restores it to normal position.

In the operation of the clutch, the throwing or letting in of the clutch must be done somewhat gradually, so that some slippage between the plates will occur until the vehicle has gotten under way; otherwise, the power of the motor is too suddenly applied to the driven shaft of the vehicle and the clutch is said to grab. When the throw-out shaft of the clutch is operated by a foot treadle, the grabbing of the clutch is avoided by the operator easing back on the foot treadle until the vehicle has picked up in speed.

Air actuated mechanism has been proposed for operating the throw-out shaft in place of the manual foot treadle, but this mechanism has usually consisted of a piston and cylinder into which compressed air is admitted to throw the clutch out or open, and from which the air is exhausted to let the clutch in. These devices have not been successful, however, because it is almost impossible to control the emission or exhaustion of air from the device in a manner which will allow the proper easing in of the clutch.

In accordance with my invention, however, I overcome this difficulty by gradually building up air pressure against a force which if unopposed acts to throw the clutch out. The building up of pressure against a throw-out force by the admission of air under pressure to the mechanism can be controlled very accurately and acts very smoothly in gradually throwing in the clutch.

As shown more particularly in Figs. 1 and 2, the outer end of the clutch throw-out or rock shaft 12 is provided with an upstanding arm 20. On opposite sides of this arm are cylinders 21 and 22 in which pistons 23 and 24 are adapted to reciprocate. The pistons 23 and 24 have piston rods 25 and 26 respectively, which extend through the heads of the cylinders and have forked end members 27 and 28 which are threaded onto the piston rods and locked by lock nuts 29 for adjustment purposes. The forked ends are pivotally connected at 30 and 31 respectively to the throw-out shaft arm 20. Each piston is provided with a stop member 32 which bears against the cylinder head and acts as a limit stop to determine the range of movement of the arm 20. Since the pivotal connections of the pistons to the arm 20 move in an arc, the cylinders are pivotally mounted at 33 and 34 on suitable brackets 35 and 36 which are mounted on the clutch housing 37 and transmission housing 38 respectively.

The cylinders are opposed to each other so far as the application of power to the arm 20 is concerned. The cylinder 22, which I term the throw-out cylinder, is directly connected by pipe 39 to a source of compressed air of preferably constant pressure, such as the compressed air tank employed on motor vehicles for air brake and other operations. The piston of cylinder 22 is thus subject to constant pressure and the parts are so proportioned that the power applied to arm 20 if unopposed is sufficient to overcome the spring mechanism of the clutch and throw out and hold out the clutch.

The cylinder 21, which I term for convenience the throw-in cylinder, is likewise connected, by means of pipes 40 and 41, to said source of compressed air through a control valve B by means of which the admission of air to and the exhaustion of air from cylinder 21 is controlled. The power applied to arm 20 by the piston of cylinder 21 is opposite to that of cylinder 22, and the parts are so proportioned that its applied power can be substantially equal to that of cylinder 22.

The metering or control valve B may be of any suitable type for the purpose. The valve shown in Fig. 2 is of a type now in use for air-flow control. It is provided with two chambers 42 and 43. Chamber 42 is connected by pipe 41 to the throw-in cylinder 21 and chamber 43 exhausts to the atmosphere through pipe 44. The flow of air to and from this chamber 42, and hence the cylinder 21, is controlled by the valve 45 which has two valve members on the same stem. The valve member 46 when not seated admits air under pressure from the source 40 to cylinder 21. The valve member 47 seats on the end of the hollow stem 48 which moves up and down in response to the foot treadle 49. The foot treadle is fulcrumed at 50 in convenient position for the operator and its toe end is normally urged upwardly by a spring 51. Its heel end bears upon and normally holds depressed the valve stem 48 against a spring 53 in the valve which urges the stem upwardly.

Normally the metering valve is in position shown in Fig. 2 in which the valve member 45 is open and pressure is admitted to the cylinder 21. Pressure in cylinder 21 opposes that in the throw-out cylinder 22 with the result that the arm 20 is not actuated and the spring means of the clutch maintains the clutch closed.

When the operator depresses the treadle, the hollow stem 48 rises and is followed by stem 45 until valve member 46 seats and closes the flow of air to the cylinder 21. Continued rise of stem 48 lifts the stem from valve member 47 thus opening chamber 42 to the atmosphere and exhausting pressure from cylinder 21. Exhaustion of pressure from cylinder 21 thus relieves the throw-out cylinder 22 of opposition and allows it to apply power to the arm 20 and overcome the spring mechanism of the clutch to throw the clutch out quickly and positively. So long as the operator maintains this condition of the control valve, the clutch will be held out.

When the clutch is to be thrown in, the operator eases back on the foot treadle which depresses the valve stem 48 and causes first the valve member 47 to close the exhaust valve and the valve member 46 to open communication from the air pressure source to the throw-in cylinder 21. This builds up pressure in said cylinder until it overcomes the action of the throw-out cylinder and allows the spring mechanism of the clutch to restore the clutch to in position. Since the cylinder 21 is acting in the same direction as the spring mechanism of the clutch, the pressure building up in the cylinder 21 need only be equal to the pressure differential between the throw-out cylinder and the spring mechanism of the clutch. The building-up pressure in the throw-in cylinder is thus acting against the constant pressure of cylinder 22 and as a balance is reached between the building-up pressure and the differential pressure between the clutch spring mechanism and the throw-out cylinder, the clutch spring mechanism is gradually allowed to smoothly let in the clutch.

In the present structure, the cylinders are preferably of equal diameter and when, as shown in Fig. 2, both cylinders are under full pressure from the source, they both apply substantially equal power to the arm 20. It is desirable however in clutch operation to insure that the clutch levers 7 are actually slightly out of contact with bearing 9 when the clutch is in for the purpose of preventing undue wear on these parts. For this reason I have arranged the mechanism so as to give the throw-in cylinder 21 a slight mechanical advantage over the throw-out cylinder by connecting the pistons thereof on different radii to the arm 20. The pivotal connection 30 of the throw-in piston is on a longer radius than the connection 31 of the throw-out piston. Thus the power applied to the arm 20 by the throw-in cylinder will preponderate slightly over that applied by the throw-out cylinder and will insure the fingers 13 being positively held out.

In Fig. 4 I have illustrated a modification of the mechanism in which a spring 55 is utilized instead of the air-operated throw-out cylinder and in which the functions of both cylinders are combined in a single device. The cylinder 56 corresponds to the throw-in cylinder 21 and is provided with a piston 23, and a piston rod 25, pivotally connected in the same manner to the arm 20. The spring 55 is positioned between the piston and the cylinder head and acts on the piston and hence the arm 20 in the same direction as cylinder 22. The spring 55 is proportioned to apply sufficient power to overcome the spring mechanism of the clutch in the same manner as that applied by the cylinder 22. The throw-in cylinder is connected to the control valve and is controlled thereby in the same manner as hereinbefore described.

I claim:

1. In a mechanism for operating a clutch having spring means therein normally holding the clutch closed, the combination of a source of air under pressure, a clutch opening pneumatic device comprising a cylinder and piston therein connected to said source of air pressure and normally acting to overcome the spring means of the clutch to open the clutch, and a pneumatic device opposing the action of the opening device when air under pressure is admitted thereto.

2. The combination of a clutch having spring mechanism normally holding said clutch in and having a rock shaft for actuating said spring mechanism to throw the clutch in or out, a source of air under pressure, a pair of cylinders and pistons therein connected in opposed relation to said rock shaft, one of said cylinders being constantly subject to air pressure from said source and applying sufficient power to said shaft to overcome the clutch spring mechanism, and means for varying the air pressure in the other cylinder to vary the opposing application of power thereby to said rock shaft.

3. The combination of a clutch mechanism having spring mechanism normally maintaining the clutch closed, and a throw-out shaft for actuating said clutch against the action of said spring mechanism, an arm on said shaft, a pair of opposed cylinders pivotally mounted on brackets adjacent the clutch and having pistons pivotally connected to said arm, one of said pistons being constantly subject to air under pressure, a treadle, and a valve actuated by said treadle to vary the air pressure in said other cylinder.

LAWRENCE H. SMITH.